(12) United States Patent
Kelnhofer

(10) Patent No.: US 9,085,365 B2
(45) Date of Patent: Jul. 21, 2015

(54) SYSTEM FOR VENTILATION OF AN AIRCRAFT AREA

(75) Inventor: Juergen Kelnhofer, Jork (DE)

(73) Assignee: Airbus Operations GmbH, Hamburg (DE)

( * ) Notice: Subject to any disclaimer, the term of this patent is extended or adjusted under 35 U.S.C. 154(b) by 1019 days.

(21) Appl. No.: 12/995,281

(22) PCT Filed: May 6, 2009

(86) PCT No.: PCT/EP2009/003245
§ 371 (c)(1),
(2), (4) Date: Jan. 18, 2011

(87) PCT Pub. No.: WO2009/143954
PCT Pub. Date: Dec. 3, 2009

(65) Prior Publication Data
US 2011/0111683 A1    May 12, 2011

Related U.S. Application Data

(60) Provisional application No. 61/057,427, filed on May 30, 2008.

(30) Foreign Application Priority Data

May 30, 2008  (DE) .......................... 10 2008 025 960

(51) Int. Cl.
*B64D 13/00*    (2006.01)
(52) U.S. Cl.
CPC .............. *B64D 13/00* (2013.01); *B64D 13/006* (2013.01); *Y02T 50/44* (2013.01); *Y02T 50/56* (2013.01)
(58) Field of Classification Search
USPC ............................................. 454/76–77, 148

IPC ..................... B64D 13/00,13/006; Y02T 50/56
See application file for complete search history.

(56) References Cited

U.S. PATENT DOCUMENTS 3,269,801 A * 8/1966 Boberg et al. ................. 422/612
4,460,036 A * 7/1984 Yoshimi et al. ............... 165/203
(Continued)

FOREIGN PATENT DOCUMENTS

DE         10361657       8/2005
DE       102004039669     3/2006
(Continued)

OTHER PUBLICATIONS

European Patent Office, International Search Report PCT/EP2009/003245, PCT/ISA/210, PCT/ISA/237.
(Continued)

*Primary Examiner* — Steven B McAllister
*Assistant Examiner* — Helena Kosanovic
(74) *Attorney, Agent, or Firm* — Wood, Herron & Evans, LLP

(57) ABSTRACT

A ventilation system for ventilation of an aircraft area includes a ram-air duct with an air inlet, a first ram-air duct branch and a second ram-air duct branch parallel to the first ram-air duct branch. A supply line connected to the ram-air duct is adapted to supply air flowing through the ram-air duct to the aircraft area to be ventilated. In the first ram-air duct branch a conveying device is arranged. In the second ram-air duct branch a heat exchanger of an aircraft system to be supplied with cooling energy is arranged. The ventilation system provides ventilation to the aircraft area during ground operation without requiring the conveying device to flow air through the heat exchanger.

17 Claims, 2 Drawing Sheets

(56) References Cited

U.S. PATENT DOCUMENTS

| | | | |
|---|---|---|---|
| 4,674,704 A * | 6/1987 | Altoz et al. | 244/1 R |
| 4,865,267 A | 9/1989 | Severson | |
| 5,669,813 A * | 9/1997 | Jairazbhoy et al. | 454/69 |
| 5,709,103 A | 1/1998 | Williams | |
| 6,375,849 B1 * | 4/2002 | Crabtree et al. | 210/652 |
| 6,619,589 B2 * | 9/2003 | Brasseur et al. | 244/118.5 |
| 6,908,062 B2 * | 6/2005 | Munoz et al. | 244/118.5 |
| 7,618,008 B2 * | 11/2009 | Scherer et al. | 244/117 R |
| 8,602,088 B2 * | 12/2013 | Solntsev et al. | 165/41 |
| 2001/0025506 A1 * | 10/2001 | Buchholz et al. | 62/401 |
| 2002/0020515 A1 * | 2/2002 | Hasenoehrl et al. | 165/41 |
| 2004/0123609 A1 * | 7/2004 | Gottlieb | 62/117 |
| 2005/0151019 A1 * | 7/2005 | Stevens | 244/135 R |
| 2005/0279208 A1 | 12/2005 | Schwalm | |
| 2007/0117501 A1 * | 5/2007 | Solntsev et al. | 454/76 |
| 2007/0157647 A1 * | 7/2007 | Duhme et al. | 62/196.4 |
| 2007/0267060 A1 * | 11/2007 | Scherer et al. | 137/13 |
| 2008/0090510 A1 * | 4/2008 | Scherer et al. | 454/71 |
| 2009/0014593 A1 * | 1/2009 | Westenberger et al. | 244/209 |
| 2009/0084896 A1 * | 4/2009 | Boucher et al. | 244/118.5 |
| 2009/0221224 A1 * | 9/2009 | Centofante | 454/76 |
| 2009/0255277 A1 * | 10/2009 | Kelnhofer et al. | 62/82 |
| 2011/0099834 A1 * | 5/2011 | Brown | 34/132 |
| 2011/0136425 A1 * | 6/2011 | Eichholz et al. | 454/76 |
| 2011/0283713 A1 * | 11/2011 | Kelnhofer | 60/806 |
| 2012/0064816 A1 * | 3/2012 | Krakowski et al. | 454/76 |

FOREIGN PATENT DOCUMENTS

| | | |
|---|---|---|
| EP | 1138592 | 10/2001 |
| RU | 20020132858 | 2/2004 |
| WO | 2005063569 | 7/2005 |

OTHER PUBLICATIONS

Russian Patent Office, Decision To Grant, (8 pgs.), English language translation (4 pgs.), Dec. 12, 2012.

* cited by examiner

SYSTEM FOR VENTILATION OF AN AIRCRAFT AREA

This application claims priority to PCT Application No. PCT/EP2009/003245, filed on May 6, 2009, under Section 371 and/or as a continuation under Section 120, which claims priority to German Application No. 10 2008 025 960.8 and U.S. Provisional Application No. 61/057,427, both filed on May 30, 2008.

TECHNICAL FIELD

The present invention relates to a system for ventilation of an aircraft area.

BACKGROUND

On board an aircraft there are various areas where the exceeding of a predetermined temperature and the development of heat accumulation has to be reliably prevented. Particularly in aircraft areas that are used as installation space for thermally loaded equipment, such as for example the air conditioning units or the electronic control components of the aircraft, an adequate removal of heat from the thermally loaded equipment has to be guaranteed by proper ventilation of these areas both during ground operation and cruising of the aircraft. Furthermore, in aircraft areas used for example as installation space for thermally loaded equipment an adequate exchange of air has to be ensured in order to prevent heating of the aircraft structure and/or the development of accumulations of ignitable fuel and/or fuel vapor.

DE 103 61 657 A1 describes a system for supplying an aircraft area with cooling air, which comprises a ram-air duct with an air inlet as well as a diffuser and a bypass duct extending parallel to a sub-section of the ram-air duct. The ram-air duct runs into a cooling-air plenum chamber, branching off from which are a supply line of an unpressurized bay ventilation (UBV) system, a supply line of an oxygen generating system and a supply line of an inert-gas generating system. Through the supply line of the UBV system ventilation air is supplied to an aircraft area that is to be ventilated. In the supply lines of the oxygen generating system and the inert-gas generating system, on the other hand, in each case a heat exchanger is arranged, which is supplied with cooling energy by the air flowing through the ram-air duct.

During cruising of the aircraft, in the ram-air duct there is a build-up, relative to the ambient pressure, of a static overpressure that is also referred to as ram pressure, which effects a flow of ambient air through the ram-air duct, the cooling-air plenum chamber and the supply lines connected to the cooling-air plenum chamber. During ground operation of the aircraft, on the other hand, an air compressor arranged in the bypass duct ensures an adequate flow of air through the ram-air duct, the cooling-air plenum chamber and the supply lines connected to the cooling-air plenum chamber.

The cooling air supply system known from DE 103 61 657 A1 performs the dual function of, on the one hand, supplying ventilation air to an aircraft area to be ventilated and, on the other hand, ensuring a proper supply of cooling energy to the heat exchangers of the oxygen generating system and the inert-gas generating system. The integration of the heat exchangers of the oxygen generating system and the inert-gas generating system into the cooling air supply system supplying ventilation air to an aircraft area to be ventilated therefore makes it possible to dispense with a separate ram-air duct for supply of the heat exchangers with cooling energy. As a result, weight- and cost savings can be realized, the installation space requirement of the overall system can be reduced and consequently the fuel consumption of the aircraft while cruising can be decreased.

A drawback of the cooling air supply system described in DE 103 61 657 A1 is however that, because of the system layout comprising a cooling-air plenum chamber and three supply lines connected parallel to one another to the cooling-air plenum chamber, in all operating states of the system, i.e. both when the aircraft is situated on the ground and during cruising of the aircraft, a proper supply of the UBV system with ventilation air requires taking into account the pressure drop caused by the heat exchangers of the oxygen generating system and the inert-gas generating system. Consequently, the air compressor arranged in the bypass duct and the air inlet of the ram-air duct have to be dimensioned in a way that allows an adequate quantity of ventilation air to be supplied to the UBV system also during ground operation of the aircraft despite the pressure drop caused by the heat exchangers of the oxygen generating system and the inert-gas generating system.

The underlying object of the present invention is to provide a system for ventilation of an aircraft area, which both during ground operation and during cruising of an aircraft guarantees a reliable ventilation of an aircraft area to be supplied with ventilation air and additionally during cruising of the aircraft enables a proper and energy-efficient supply of cooling energy to a heat exchanger integrated into the ventilation system.

SUMMARY OF THE INVENTION

To achieve this object, a system according to the invention for ventilation of an aircraft area comprises a ram-air duct, which comprises an air inlet, a first ram-air duct branch and a second ram-air duct branch allowing for being flowed parallel to the first ram-air duct branch. The air inlet of the ram-air duct is preferably formed in a weight-saving manner without a control flap, so that the quantity of air allowed to be supplied through the air inlet into the ram-air duct is determined substantially by the dimensioning of the air inlet. For example, the air inlet may be formed in the form of a so-called NACA inlet (NACA: National Advisory Committee for Aeronautics). Connected to the ram-air duct is a supply line which is adapted to supply air flowing through the ram-air duct to the aircraft area that is to be ventilated.

During cruising of the aircraft, the ram pressure building up, relative to the ambient pressure, in the ram-air duct effects an adequate flow of air through the ram-air duct and into the aircraft area to be ventilated. As a result, in the aircraft area to be ventilated an adequate removal of heat from thermally loaded equipment is guaranteed and/or a heating of the aircraft structure and/or the development of accumulations of ignitable fuel and/or fuel vapour is prevented. During ground operation of the aircraft, on the other hand, a conveying device arranged in the first ram-air duct branch ensures an adequate supply of air through the ram-air duct into the aircraft area to be ventilated. The conveying device may be for example a suitably dimensioned blower or a turbo-compressor, which is driven by hot bleed air from the engines of the aircraft.

In the second ram-air duct branch of the ventilation system according to the invention a heat exchanger of an aircraft system to be supplied with cooling energy is arranged. The heat exchanger may be a single heat exchanger, a double heat exchanger, an air-to-air heat exchanger, an air-to-liquid heat exchanger or a differently designed heat exchanger. The essential point is simply, that the heat exchanger is used to supply an aircraft system with cooling energy provided by the air flowing through the ram-air duct. Due to the arrangement according to the invention of the heat exchanger in the second ram-air duct branch, the conveying device arranged in the first ram-air duct branch may be operated independently of the pressure drop in the ram-air duct caused by the heat exchanger. In other words, the conveying device, unlike in the systems of prior art, no longer has to be capable of compensating the pressure drop in the ram-air duct caused by the heat exchanger in order to guarantee an adequate supply of ventilation air in the aircraft area to be ventilated during ground operation of the aircraft. The conveying device may therefore be of a markedly smaller and more lightweight design.

With the aid of the ventilation system according to the invention adequate ventilation air may be supplied to the aircraft area to be ventilated both during cruising and during ground operation of the aircraft. Furthermore, during cruising of the aircraft an additional aircraft system is supplied with cooling energy with the aid of the heat exchanger arranged in the second ram-air duct branch. The essential point here is simply that the heat exchanger has to provide its functionality only during cruising of the aircraft, i.e. once the aircraft has reached a specific minimum flying speed and consequently, even without the assistance of a conveying device, an adequate flow of air through the second ram-air duct branch is guaranteed. The aircraft system that is supplied with cooling energy with the aid of the heat exchanger arranged in the second ram-air duct branch is therefore preferably an aircraft system that has no cooling requirement during ground operation of the aircraft.

By integrating the heat exchanger into the ram-air duct of an existing ventilation system it is possible to realize savings in weight, installation space volume and costs. Furthermore, by dispensing with an additional ram-air duct the aircraft drag and consequently the fuel consumption of the aircraft may be reduced. The arrangement of the heat exchanger in the second ram-air duct branch moreover makes it possible to avoid a loss in performance of the ventilation system because cooling energy is supplied to the heat exchanger only during cruising of the aircraft. As the air inlet of the ram-air duct is conventionally dimensioned in such a way that during ground operation of the aircraft an adequate supply of ventilation air into the aircraft area to be ventilated is guaranteed, during cruising of the aircraft there is in any case a "surplus" air-mass flow. This may be used in an optimum manner in terms of energy to supply cooling energy to the heat exchanger arranged in the second ram-air duct branch.

As already mentioned, the aircraft system to be supplied with cooling energy by the heat exchanger should be an aircraft system that has a cooling requirement only during cruising of the aircraft from a specific minimum flying speed of the aircraft up. For example, the aircraft system to be supplied with cooling energy may be an oxygen generating system or an inert-gas generating system. The inert-gas generating system may be used for example to supply inert gas to a fuel tank of the aircraft to reduce the risk of explosion.

The first ram-air duct branch may branch off from the second ram-air duct branch at a branching point arranged downstream of the air inlet. At a debouchment point arranged downstream of the conveying device the first ram-air duct branch may run back into the second ram-air duct branch. The ram-air duct then only over a part of its length has two branches allowing for being flowed parallelly.

The heat exchanger is preferably arranged between the branching point and the debouchment point. This arrangement guarantees that the conveying device during ground operation of the aircraft may be operated independently of the pressure drop in the ram-air duct caused by the heat exchanger, because the conveying device does not have to convey the air through the heat exchanger.

The supply line of the ventilation system according to the invention is connected preferably downstream of the debouchment point to the ram-air duct. For example, the ram-air duct may run directly into the supply line. Alternatively, the supply line may however branch off from the ram-air duct.

In the second ram-air duct branch a shut-off valve may be arranged upstream or downstream of the heat exchanger. The shut-off valve is adapted to open the second ram-air duct branch for throughflow in a first position. In a second position, on the other hand, the shut-off valve closes the second ram-air duct branch. During cruising of the aircraft, when air is to flow through the second ram-air duct branch in order to supply cool ambient air to the heat exchanger of the aircraft system to be supplied with cooling energy, the shut-off valve is preferably in its first position. During ground operation of the aircraft, when ambient air is conveyed with the aid of the conveying device through the first ram-air duct branch in order to supply it to the aircraft area to be ventilated, the shut-off valve on the other hand is preferably in its second position, in which it closes the second ram-air duct branch. This prevents an air circulation between the first and the second ram-air duct branch.

Preferably, in the ventilation system according to the invention the heat exchanger, the aircraft system to be supplied with cooling energy by the heat exchanger, the air inlet and the second ram-air duct branch are designed and dimensioned such that the ventilation of the aircraft area to be ventilated is not impaired by the heating of the air supplied through the second ram-air duct branch as it flows through the heat exchanger. This guarantees that the air, even after flowing through the heat exchanger, may still be used to ventilate the aircraft area to be ventilated. For example, the previously described components may be designed and dimensioned such that the air, as it flows through the heat exchanger, is not heated above 80° C. The maximum temperature of 80° C. cited here is defined by the requirements of the aircraft structure and the aircraft area to be ventilated. However, depending on the structure material and the conditions in the aircraft area to be ventilated, this temperature may also be below or above 80° C.

The supply line of the ventilation system according to the invention may comprise a first branch connectable to a wing root area of the aircraft and a second branch connectable to a belly fairing of the aircraft. The ventilation system according to the invention may then be used to supply ventilation air to two aircraft areas, namely the wing root area and the belly fairing of the aircraft. However, depending on the application, the aircraft area to be ventilated with the aid of the ventilation system according to the invention may be only the belly fairing, only one wing root area, both wing root areas or some other aircraft area.

The system according to the invention for ventilation of an aircraft area may further comprise a further ram-air duct comprising an air inlet, a first ram-air duct branch and a second ram-air duct branch allowing for being flowed parallel to the first ram-air duct branch. The further ram-air duct may be connected to a further supply line that is adapted to supply an aircraft area to be ventilated with air flowing through the further ram-air duct. The aircraft area to be ventilated may be the aircraft area that is already supplied with ventilation air by the ram-air duct. Alternatively, the aircraft area to be ventilated that is supplied with ventilation air by the further ram-air duct may however be a further aircraft area. In the first ram-air duct branch of the further ram-air duct a further conveying device may be arranged, which during ground operation of the aircraft conveys air through the first ram-air duct branch.

In the second ram-air duct branch of the further ram-air duct a further heat exchanger of an aircraft system to be supplied with cooling energy may further be arranged. It is however alternatively possible to dispense with the arrangement of a further heat exchanger in the second ram-air duct branch of the further ram-air duct. The further heat exchanger may supply the same aircraft system with cooling energy as the heat exchanger arranged in the second ram-air duct branch of the ram-air duct. Alternatively, the further heat exchanger may however be used to supply a further aircraft system with cooling energy.

The first ram-air duct branch of the further ram-air duct may branch off from the second ram-air duct branch of the further ram-air duct at a branching point arranged downstream of the air inlet of the further ram-air duct. At a debouchment point arranged downstream of the further conveying device the first ram-air duct branch of the further ram-air duct may run back into the second ram-air duct branch of the further ram-air duct. The further ram-air duct then, like the ram-air duct, has only over a part of its length two branches allowing for being flowed parallelly. The further heat exchanger is preferably arranged between the branching point and the debouchment point.

The further supply line of the ventilation system according to the invention is preferably connected downstream of the debouchment point to the further ram-air duct. For example, the further ram-air duct may run directly into the further supply line. Alternatively, the further supply line may however branch off from the further ram-air duct.

In the second ram-air duct branch of the further ram-air duct a shut-off valve may be arranged upstream or downstream of the further heat exchanger. The shut-off valve is adapted to open the second ram-air duct branch of the further ram-air duct for throughflow in a first position. In a second position, on the other hand, the shut-off valve closes the second ram-air duct branch of the further ram-air duct. During cruising of the aircraft, when air is to flow through the second ram-air duct branch of the further ram-air duct in order to supply cool ambient air to the further heat exchanger of the aircraft system to be supplied with cooling energy, the shut-off valve is preferably in its first position. During ground operation of the aircraft, on the other hand, when ambient air is conveyed through the first ram-air duct branch of the further ram-air duct with the aid of the further conveying device in order to supply it to the aircraft area to be ventilated, the shut-off valve is preferably situated in its second position, in which it closes the second ram-air duct branch of the further ram-air duct. This prevents an air circulation between the first and the second ram-air duct branch of the further ram-air duct.

Preferably, in the ventilation system according to the invention the further heat exchanger, the aircraft system to be supplied with cooling energy by the further heat exchanger, the air inlet of the further ram-air duct and the second ram-air duct branch of the further ram-air duct are designed and dimensioned such that the ventilation of the aircraft area to be ventilated is not impaired by the heating of the air supplied through the second ram-air duct branch of the further ram-air duct as it flows through the further heat exchanger. This guarantees that the air, even after flowing through the further heat exchanger, may still be used to ventilate the aircraft area to be ventilated. For example, the previously described components may be designed and dimensioned such that the air, as it flows through the further heat exchanger, is not heated above 80° C. The maximum temperature of 80° C. cited here is defined by the requirements of the aircraft structure as well as the aircraft area to be ventilated. However, depending on the structure material and the conditions in the aircraft area to be ventilated, this temperature may also be below or above 80° C.

The further supply line of the ventilation system according to the invention may comprise a first branch connectable to a wing root area of the aircraft and a second branch connectable to the belly fairing of the aircraft.

The supply line connected to the ram-air duct may be connected to the further supply line connected to the further ram-air duct. For example, an arrangement is possible, in which the second branch of the supply line is connected to a second branch of the further supply line, wherein both the second branch of the supply line and the second branch of the further supply line supply ventilation air to the belly fairing of the aircraft.

In order, given such an arrangement, to prevent an undesirable air circulation between the supply line and the further supply line, a shut-off valve is preferably arranged in each case in the supply line connected to the ram-air duct and in the further supply line connected to the further ram-air duct. The shut-off valves are in each case adapted to open the supply line and the further supply line for throughflow, respectively, in a first position. In a second position, on the other hand, the shut-off valves close the supply line and the further supply line, respectively.

BRIEF DESCRIPTION OF THE DRAWINGS

There now follows a detailed description of a preferred embodiment of the invention with reference to the accompanying schematic drawings, of which.

DETAILED DESCRIPTION

Figure 1:
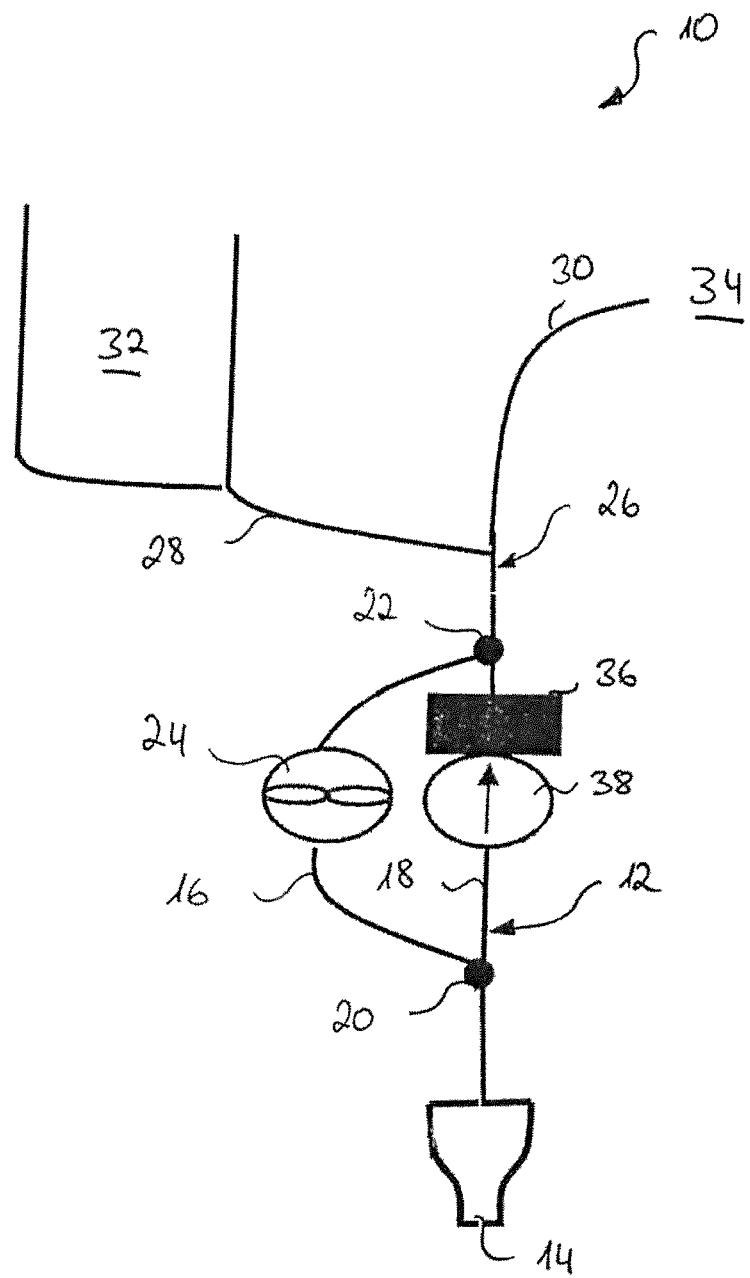
FIG. 1 shows a first embodiment of a system for ventilation of an aircraft area.

A ventilation system 10 represented in FIG. 1 comprises a ram-air duct 12, which comprises an air inlet 14 formed in the form of an NACA inlet. Through the air inlet 14 ambient air is allowed to be supplied into the ram-air duct 12. The ram-air duct 12 has a first ram-air duct branch 16 as well as a second ram-air duct branch 18 allowing to be flowed parallel to the first ram-air duct branch 16. The first ram-air duct branch 16 branches off from the second ram-air duct branch 18 at a branching point 20 arranged downstream of the air inlet 14. At a debouchment point 22 the second ram-air duct branch 18 however runs back into the first ram-air duct branch 16. Consequently, the ram-air duct 12 has only over a part of its length two branches 16, 18 allowing for being flowed parallelly.

In the first ram-air duct branch 16 a conveying device 24 formed in the form of a blower is arranged. Whereas during cruising of the aircraft, because of the ram pressure building up, relative to the ambient pressure, in the ram-air duct 12, ambient air flows through the ram-air duct 12, during ground operation of the aircraft, the conveying device 24 provides a flow of ambient air through the first ram-air duct branch 16.

Downstream of the debouchment point 22 of the first ram-air duct branch 16 into the second ram-air duct branch 18, the ram-air duct 12 is connected to a supply line 26. The supply line 26 comprises a first branch 28 as well as a second branch 30. The first branch 28 of the supply line 26 is connected to an—in flying direction of the aircraft—left wing root area 32 of the aircraft in order to supply ventilation air to the wing root area 32 of the aircraft both during ground operation and during cruising of the aircraft. The second branch 30 of the supply line 26, on the other hand, is connected to a belly fairing 34 of the aircraft in order to supply ventilation air to the belly fairing 34 both during ground operation and during cruising of the aircraft.

In the second ram-air duct branch 18 a heat exchanger 36 is arranged downstream of the branching point 20 and upstream of the debouchment point 22. The heat exchanger 36 is used to supply cooling energy to an aircraft system that has a cooling requirement only during cruising of the aircraft, i.e. only when the aircraft has already reached a specific minimum flying speed. For example, the heat exchanger 36 may be used to supply cooling energy to an oxygen generating system or an inert-gas generating system of the aircraft.

Because of the arrangement of the heat exchanger 36 in the second ram-air duct branch 18, the conveying device 24 during ground operation of the aircraft does not have to convey any air through the heat exchanger 36. Consequently, there is also no need for the conveying device 24 to be designed in such a way that it is capable of compensating a pressure drop caused by the heat exchanger 36.

During cruising of the aircraft, on the other hand, the ram pressure building up, relative to the ambient pressure, in the ram-air duct 12 effects an adequate flow of air through the ram-air duct 12. As the air inlet 14 of the ram-air duct 12 is dimensioned such that during ground operation of the aircraft an adequate supply of ventilation air into the aircraft areas 32, 34 to be ventilated is guaranteed, during cruising of the aircraft there is in any case a "surplus" air-mass flow. This may be used in an optimum manner in terms of energy to supply cooling energy to the heat exchanger 36 disposed in the second ram-air duct branch 18.

In the second ram-air duct branch 18 a shut-off valve 38 is arranged upstream of the heat exchanger 36. The shut-off valve 38 might however alternatively be positioned downstream of the heat exchanger 36. In a first position the shut-off valve 38 opens the second ram-air duct branch 18 for throughflow. In a second position, on the other hand, the shut-off valve 38 closes the second ram-air duct branch 18. During ground operation of the aircraft, i.e. when ambient is conveyed with the aid of the conveying device 24 through the ram-air duct 12, the shut-off valve 38 is in its second position closing the second ram-air duct branch 18, so that an air circulation between the first ram-air duct branch 16 and the second ram-air duct branch 18 is prevented.

Figure 2:
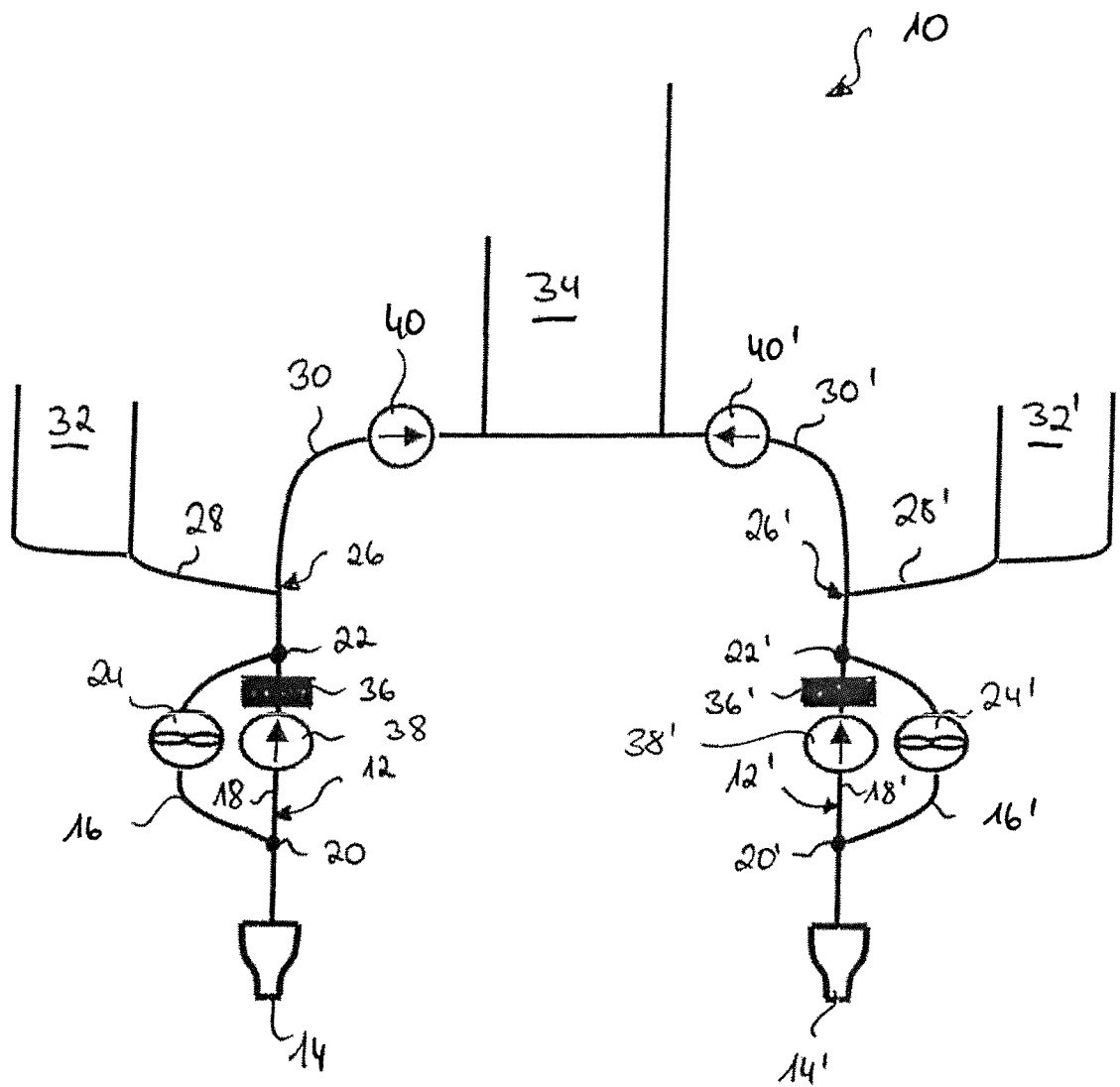
FIG. 2 shows a further embodiment of a system for ventilation of an aircraft area.

The ventilation system 10 represented in FIG. 2 differs from the arrangement represented in FIG. 1 in that it comprises a further ram-air duct 12' with an air inlet 14', a first ram-air duct branch 16' and a second ram-air duct branch 18' allowing for being flowed parallel to the first ram-air duct branch 16'. A further supply line 26' connected to the further ram-air duct 12' comprises a first branch 28' and a second branch 30'. The first branch 28' of the further supply line 26' is connected to an—in flying direction of the aircraft—right wing root area 32' of the aircraft and supplies ambient air flowing through the further ram-air duct 12' to the right wing root area 32' both during ground operation and during cruising of the aircraft. The second branch 30' of the further supply line 26', on the other hand, is connected to the second branch 30 of the supply line 26 and, like the second branch 30 of the supply line 26, supplies ambient air to the belly fairing 34 of the aircraft both during ground operation and during cruising of the aircraft.

In the first ram-air duct branch 16' of the further ram-air duct 12' a further conveying device 24' is arranged. A shut-off valve 38' arranged in the second ram-air duct branch 18' of the further ram-air duct 12', in its closing position prevents an air circulation between the first ram-air duct branch 16' and the second ram-air duct branch 18' of the further ram-air duct 12'. In FIG. 2 the shut-off valve 38' is arranged upstream of the further heat exchanger 36' but might alternatively be positioned downstream of the further heat exchanger 36'. Shut-off valves 40, 40', which are arranged in the second branch 30 of the supply line 26 and in the second branch 30' of the further supply line 26', in their closing position prevent an air circulation between the supply line 26 and the further supply line 26'.

In the embodiment of a ventilation system 10 represented in FIG. 2, a further heat exchanger 36' is arranged in the second ram-air duct branch 18' of the further ram-air duct 12' and supplies cooling energy to an aircraft system, for example to an oxygen generating system or an inert-gas generating system. However, as an alternative to the arrangement according to FIG. 2 a heat exchanger may be arranged only in the second ram-air duct branch 18 of the ram-air duct 12 or in the second ram-air duct branch 18' of the further ram-air duct 12'. The heat exchanger 36 and the further heat exchanger 36' may supply cooling energy to the same aircraft system. The heat exchanger 36 and the further heat exchanger 36' may however alternatively be associated with different aircraft systems.

The invention claimed is:

1. A ventilation system for ventilation of an aircraft area, comprising:
    a ram-air duct, which comprises an air inlet, a first ram-air duct branch and a second ram-air duct branch arranged in parallel to the first ram-air duct branch, the first ram-air duct branch and the second ram-air duct branch rejoining at a debouchment point downstream of a branching point where the first ram-air duct branch separates from the second ram-air duct branch,
    a supply line, which is connected to the ram-air duct downstream of the debouchment point where the first ram-air duct and the second ram-air duct rejoin, and which supplies air flowing through the ram-air duct to the aircraft area to be ventilated, the air flowing into the aircraft area to be ventilated from the supply line thereby ventilating the aircraft area to be ventilated, by removing heat energy or accumulations of fuel vapor from the aircraft area to be ventilated,
    a blower arranged in the first ram-air duct branch, and
    a heat exchanger of an aircraft system to be supplied with cooling energy and a shut-off valve, the heat exchanger and the shut-off valve arranged in the second ram-air duct branch.

2. The ventilation system according to claim 1, wherein the aircraft system to be supplied with cooling energy is an oxygen generating system or an inert-gas generating system.

3. The ventilation system according to claim 1, wherein the heat exchanger is arranged between the branching point and the debouchment point.

4. The ventilation system according to claim 1, wherein the shut-off valve is closed during ground operation such that the blower is not required to overcome a pressure drop caused by flow through the heat exchanger.

5. The ventilation system according to claim 1, wherein the heat exchanger, the aircraft system to be supplied with cooling energy by the heat exchanger, the air inlet and the second ram-air duct branch are designed and dimensioned such that the ventilation of the aircraft area to be ventilated is not impaired by the heating of the air supplied through the second ram-air duct branch as the air flows through the heat exchanger.

6. The ventilation system according to claim 1, wherein the supply line comprises a first branch connected to a wing root area of the aircraft and a second branch connected to a belly fairing of the aircraft.

7. The ventilation system according to claim 1, further comprising:
a further ram-air duct, which comprises a further air inlet, a first ram-air duct branch and a second ram-air duct branch arranged in parallel to the first ram-air duct branch of the further ram-air duct,
a further supply line, which is connected to the further ram-air duct and which is adapted to supply air flowing through the further ram-air duct to an aircraft area to be ventilated, and
a further blower arranged in the first ram-air duct branch of the further ram-air duct.

8. The ventilation system according to claim 7, further comprising:
a further heat exchanger of the aircraft system to be supplied with cooling energy is arranged in the second ram-air duct branch of the further ram-air duct.

9. The ventilation system according to claim 8, wherein the first ram-air duct branch of the further ram-air duct branches off from the second ram-air duct branch of the further ram-air duct at a further branching point arranged downstream of the further air inlet and runs back into the second ram-air duct branch of the further ram-air duct at a further debouchment point arranged downstream of the further blower, wherein the further heat exchanger is arranged between the further branching point and the further debouchment point.

10. The ventilation system according to claim 9, wherein the further supply line is connected downstream of the further debouchment point to the further ram-air duct.

11. The ventilation system according to claim 8, further comprising:
a further shut-off valve arranged in the second ram-air duct branch of the further ram-air duct and upstream or downstream of the further heat exchanger.

12. The ventilation system according to claim 8, wherein the further heat exchanger, the aircraft system to be supplied with cooling energy by the further heat exchanger, the further air inlet of the further ram-air duct and the second ram-air duct branch of the further ram-air duct are designed and dimensioned such that the ventilation of the aircraft area to be ventilated is not impaired by the heating of the air supplied through the second ram-air duct branch of the further ram-air duct as the air flows through the further heat exchanger.

13. The ventilation system according to claim 7, wherein the further supply line comprises a first branch connected to a wing root area of the aircraft and a second branch connected to a belly fairing of the aircraft.

14. The ventilation system according to claim 7, wherein the supply line connected to the ram-air duct is connected to the further supply line connected to the further ram-air duct.

15. A ventilation system for ventilation of an aircraft area, comprising:
a ram-air duct, which comprises an air inlet, a first ram-air duct branch and a second ram-air duct branch arranged in parallel to the first ram-air duct branch,
a supply line, which is connected to the ram-air duct and which supplies air flowing through the ram-air duct to the aircraft area to be ventilated,
a conveying device arranged in the first ram-air duct branch,
a heat exchanger of an aircraft system to be supplied with cooling energy, the heat exchanger arranged in the second ram-air duct branch,
a further ram-air duct, which comprises a further air inlet, a first ram-air duct branch and a second ram-air duct branch arranged in parallel to the first ram-air duct branch of the further ram-air duct,
a further supply line, which is connected to the further ram-air duct and which is adapted to supply air flowing through the further ram-air duct to an aircraft area to be ventilated, wherein the supply line connected to the ram-air duct is connected to the further supply line connected to the further ram-air duct,
a further conveying device arranged in the first ram-air duct branch of the further ram-air duct, and
a shut-off valve arranged in each of the supply line connected to the ram-air duct and the further supply line connected to the further ram-air duct.

16. The ventilation system according to claim 4, wherein the ram-air duct does not include a heat exchanger anywhere outside the second ram-air duct branch such that closing the shut-off valve prevents air flow through any heat exchangers.

17. The ventilation system according to claim 1, wherein the aircraft system to be supplied with cooling energy requires cooling energy only during cruising flight of the aircraft.

* * * * *